| (12) | United States Patent | (10) Patent No.: | US 11,223,914 B2 |
|---|---|---|---|
| | Gülstorff | (45) Date of Patent: | Jan. 11, 2022 |

(54) HEARING DEVICE HAVING DUAL BAND RADIO USING IMAGE FREQUENCY

(71) Applicant: GN HEARING A/S, Ballerup (DK)

(72) Inventor: Steen Gülstorff, Ballerup (DK)

(73) Assignee: GN Hearing A, Ballerup (DK)

( * ) Notice: Subject to any disclaimer, the term of this patent is extended or adjusted under 35 U.S.C. 154(b) by 0 days.

(21) Appl. No.: 16/714,610

(22) Filed: Dec. 13, 2019

(65) Prior Publication Data

US 2020/0204931 A1 Jun. 25, 2020

(30) Foreign Application Priority Data

Dec. 20, 2018 (EP) ..................................... 18214366

(51) Int. Cl.
  *H04R 25/00* (2006.01)
  *H04B 1/00* (2006.01)

(52) U.S. Cl.
  CPC ........... *H04R 25/505* (2013.01); *H04B 1/006* (2013.01); *H04R 25/554* (2013.01); *H04R 2225/51* (2013.01)

(58) Field of Classification Search
  None
  See application file for complete search history.

(56) References Cited

U.S. PATENT DOCUMENTS

| 4,115,737 | A | 9/1978 | Hongu et al. |
|---|---|---|---|
| 4,163,943 | A | 8/1979 | Shin et al. |
| 5,926,466 | A | 7/1999 | Ishida et al. |
| 6,029,052 | A * | 2/2000 | Isberg .................. H04B 1/0057 455/131 |
| 6,075,996 | A | 6/2000 | Srinivas |
| 6,567,654 | B1 | 5/2003 | Coronel Arredondo et al. |
| 6,584,304 | B1 * | 6/2003 | Thomsen ............... H04B 1/005 455/188.1 |
| 2017/0117532 | A1 * | 4/2017 | Frias ................... H01M 10/486 |

OTHER PUBLICATIONS

Extended European Search Report dated Sep. 16, 2019 for corresponding European Application No. 1821436.9.

(Continued)

*Primary Examiner* — Paul W Huber
(74) *Attorney, Agent, or Firm* — Vista IP Law Group, LLP

(57) ABSTRACT

A hearing device includes: a wireless communication unit configured for receiving an antenna signal carrying information in a first frequency band having a first centre frequency, and information in a second frequency band having a second centre frequency; wherein the wireless communication unit comprises: a local oscillator configured to provide a local oscillator signal; a mixer configured to receive the local oscillator signal and mixing the antenna signal with the local oscillator signal, the mixer providing an output signal; and an IF filter configured to receive the output signal; wherein an IF centre frequency associated with the IF filter is equal to a fraction of a difference between the second centre frequency and the first centre frequency; and wherein a local oscillator frequency associated with the local oscillator is equal to a difference between the second centre frequency and the IF centre frequency.

38 Claims, 7 Drawing Sheets

(56) References Cited

OTHER PUBLICATIONS

Garcia, Raymundo C., et al. "Improved Demultiplexing Algorithm for Hardware Simplification of Sensored Vecor Control Through Frequency-Domain Mulitplexing", Aug. 2017, IEEE Transactions on Industrial Electronics, vol. 64, No. 8.
European Search Report dated Sep. 16, 2019 for EP Appln. No. 18214366.9.
García, Raymundo C., et al. "Improved demultiplexing algorithm for hardware simplification of sensored vector control through frequency-domain multiplexing." IEEE Transactions on Industrial Electronics 64.8 (2017): 6538-6548.

* cited by examiner

HEARING DEVICE HAVING DUAL BAND RADIO USING IMAGE FREQUENCY

RELATED APPLICATION DATA

This application claims priority to, and the benefit of, European Patent Application No. 18214366.9 filed on Dec. 20, 2018. The entire disclosure of the above application is expressly incorporated by reference herein.

FIELD

The present disclosure relates to a method and a hearing device configured for wireless communication, particularly for such hearing devices comprising a wireless communication unit configured for receiving an antenna signal carrying information in a first frequency band having a first centre frequency and in a second frequency band having a second centre frequency.

BACKGROUND

Hearing devices, such as hearing aids, may comprise an antenna and a wireless communication unit for communication with another hearing device in a binaural hearing device system, and/or for communication with other electronic devices, such as smart phones, hearing device accessories, etc.

In some instances intermediate frequencies are used, the intermediate frequency (IF) being a frequency to which an antenna signal or carrier wave is shifted as an intermediate step in transmission or reception. The signal at the (lower) intermediate frequency may enable less complex signal processing compared to the signal processing of high frequency signals. Furthermore, frequency selection may be improved when using intermediate frequencies.

However, there is a need for an improved hearing device providing communication with other hearing devices or electronic devices.

SUMMARY

It is an object of the present disclosure to provide improved communication for a hearing device, particularly when receiving a dual band antenna signal.

Disclosed is a hearing device comprising a wireless communication unit configured for receiving an antenna signal carrying information in a first frequency band having a first centre frequency and in a second frequency band having a second centre frequency. The wireless communication unit may be interconnected with an antenna; the antenna being configured for transmitting and receiving electromagnetic radiation. The antenna may be configured for providing the antenna signal. The wireless communication unit comprises a local oscillator configured for providing a local oscillator signal and a mixer configured for receiving the local oscillator signal and the antenna signal. The mixer is configured for mixing the antenna signal with the local oscillator signal. The mixer provides an output signal, such as a mixed output signal. The wireless communication unit further comprises an intermediate frequency (IF) filter configured for receiving the output signal. The intermediate frequency (IF) filter is configured to have an intermediate frequency (IF) centre frequency being the difference between the second centre frequency and the first centre frequency divided by two (e.g., IF=(f2−f1)/2). The local oscillator frequency $f_{LO}$ may be configured to be the second centre frequency subtracted the intermediate frequency (IF) filter centre frequency (e.g., $f_{LO}$=f2−IF). Since $f_{LO}$=f2−IF=f2−(f2−f1)/2, that means fu)=f2−f2/2+f1/2= (f2+f1)/2. In other words, the local oscillator frequency $f_{LO}$ may be configured to be equal to the sum of the second centre frequency and the first center frequency divided by 2, +/−5%, or +/−10% (e.g., a value V anywhere between 1.8 and 2.2, such as 2). Thus, $f_{LO}$=(f1+f2)/V, where V is anywhere from 1.8 to 2.2, such as 2.

Disclosed is a hearing device comprising a wireless communication unit interconnected with an antenna; the antenna being configured for transmitting and receiving electromagnetic radiation. The antenna may be a dual-band antenna. The antenna signal may be a dual band antenna signal. The dual band antenna signal may be carrying information in a first frequency band having a first centre frequency and in a second frequency band having a second centre frequency. Typically, the antenna is a radio frequency antenna configured for transmitting and receiving electromagnetic radiation at radio frequencies.

The local oscillator providing the local oscillator signal may be any local oscillator, the local oscillator may be a fixed frequency local oscillator signal or the local oscillator may be a variable frequency local oscillator. The mixer is configured to receive the local oscillator signal and to mix the antenna signal with the local oscillator signal. The mixer may be implemented in any known way and may for example use a non-linear component or a time-varying component, to produce both sum and difference frequency signals, such as beat frequencies signals, wherein the sum and the difference frequency signal each contains the modulation of the antenna signal.

Generally, when an input radio frequency (RF) signal is received, the output of the mixer may include the RF signal at $f_{RF}$, the local oscillator signal at $f_{LO}$, and the two new heterodyne frequencies $f_{RF}+f_{LO}$ and $f_{RF}-f_{LO}$. The frequency of the local oscillator $f_{LO}$ may be selected so that the antenna signal at the radio frequency $f_{RF}$ mixes to $f_{IF}$. The local oscillator frequency may be selected to provide either the mixer product at $f_{RF}+f_{LO}$, or the mixer product at $f_{RF}-f_{LO}$. The local oscillator frequency may be selected to be less than the antenna signal frequency, so that $f_{IF}=f_{RF}-f_{LO}$ (low-side injection). The local oscillator frequency may be selected to be higher that the antenna signal frequency, so that $f_{IF}=f_{LO}-f_{RF}$ (high-side injection). Typically, one of these intermediate frequencies will be selected and amplified, while the other, the image response frequency, will be suppressed.

It is an advantage that when selecting the first centre frequency, the second centre frequency, the local oscillator frequency and the IF centre frequency carefully, the response frequency and the image response frequency may be used to thereby provide a dual-band wireless communication unit. The IF centre frequency may be selected as the difference between the second centre frequency and the first centre frequency divided by two, and the local oscillator frequency may be configured to be the second centre frequency subtracted the IF centre frequency. Hereby, the wireless communication unit will be able to receive and/or transmit at both the first frequency $f_1$ in that $f_{LO}-f_1$, =$F_{IF}$ (high-side injection) and at the second frequency $f_2$ in that f2−$f_{LO}$=$F_{IF}$ (low-side injection). For example, for the selected local oscillator frequency, $f_{LO}$, signals, and the energy thereof, at $f_{LO}+f_{IF}$ and $f_{LO}-f_{IF}$ is converted to the same IF frequency.

As an example, the first frequency could be 1.6 GHz, the second frequency could be 2.4 GHz, the local oscillator frequency may selected to be 2 GHz and the intermediate frequency, such as the IF center frequency, is 400 MHz. The IF center frequency is thus the same for first signal at the first frequency and the second signal at the second frequency.

In some embodiments, the first frequency and the second frequency are relatively close in frequency, so that a difference between the first frequency and the second frequency is in the order of half the first frequency. The second frequency may be double that of the first frequency, such as less than double that of the first frequency, such as less than 100% larger, such as less than 50% larger than the first frequency, such as between 30% and 50% larger. $f_{LO} \pm f_{IFnon}$ In some embodiments, the IF center frequency is selected to be a relative high frequency, such as a frequency above 100 MHz, such as above 200 MHz, such as about 400 MHz, such as between 100 MHz and 800 MHz, such as between 200 MHz and 600 MHz, such as between 250 MHz and 550 MHz.

In some embodiments, particularly when having a high IF center frequency, a dual conversion wireless communication unit may be preferred, that is a wireless communication unit having a second mixer and a second local oscillator.

In some embodiments, the antenna signal carrying information in a first frequency band and a second frequency band uses time-division multiplexing and/or frequency division multiplexing. The antenna signal may comprise a first signal having a first centre frequency and a second signal having a second centre frequency, the first signal and the second signal being multiplexed onto the antenna signal. In some embodiments, the first frequency band and the second frequency band are non-overlapping frequency bands.

In some embodiments, the hearing device further comprises a switch, such as a switching element. The switching element is configured for switching between a first path and a second path. The first path providing a first primary band pass filter for the antenna signal in the first frequency band of the antenna signal, such as for the first signal, wherein the first path provides a first filtered antenna signal to the wireless communication unit.

The switching element may be configured to switch between a plurality of switching positions, including a first switching position and a second switching position; when the switch is in the first switching position the first path is enabled and when the switch is in the second switching position, the second path is enabled.

The switching element may be provided at part of an input stage for the wireless communication unit.

In some embodiments, when providing a switching element, the first path comprises a first primary band pass filter and the first filtered antenna signal, that is primarily the first signal, is provided to the wireless communication unit. Thereby, the wireless communication unit receives information about the frequency distribution of the first filtered antenna signal, such as about the first signal. The input stage may thus comprise the first primary band pass filter.

In some embodiments, the second path provides a first secondary band pass filter for antenna signals in the second frequency band of the antenna signal, wherein the second path provides a second filtered antenna signal to the wireless communication unit. The second filtered antenna signal, that is primarily the second signal, is provided to the wireless communication unit. Thereby, the wireless communication unit receives information about the frequency distribution of the second filtered antenna signal, such as about the second signal. By toggling the switch, e.g. between the first and the second position, the wireless communication unit is configured to receive a first filtered antenna signal during a first time, and a second filtered antenna signal during a second time. Hereby, standard processing of the first and second filtered signals may be performed. The input stage may thus comprise the first secondary band pass filter.

In some embodiments, the second path provides the antenna signal to the wireless communication unit. The second path may provide the antenna signal as an unfiltered antenna signal to the wireless communication unit.

Typically, when using a wireless communication unit using mixers and IF down/up conversion, such as when using a wireless communication unit comprising a local oscillator, a mixer and an IF filter, it is important that the input to the wireless communication unit is filtered so that no noise is generated at other frequencies, and particularly so that no noise is generated at the image frequency, typically at $f_{LO}-f_{IF}$ as the signals at the image frequency would otherwise pass through the IF filter and interfere with the wanted filter. Typically, an additional filter has been provided after the mixer. However, the present inventor has found that by utilising the fact that both signal frequencies translates to the same IF frequency, both the signal and the image are used, and a filtering on the input is not needed.

Particular for use in hearing devices which are small devices having significant space constraints, it is an advantage that a single radio, such as a single wireless communication unit, may be used with an antenna signal carrying information in two frequency bands, such as in two distinct frequency bands. It is a further advantage that a filtering stage can be omitted, as also filters take up space in the hearing devices.

In some embodiments, the input stage for the wireless communication unit may comprise a second primary band pass filter for antenna signals in the first frequency band of the antenna signal, and a second secondary band pass filter for antenna signals in the second frequency band of the antenna signal. The second path may provide a second primary band pass filter for antenna signals in the first frequency band of the antenna signal, and provides a second secondary band pass filter for antenna signals in the second frequency band of the antenna signal.

In some embodiments, the switching element is configured for switching between the first path and the second path at predetermined time intervals, such as at 500 ms, 200 ms, such as at 100 ms, such as at between 100 ms and 500 ms. The output signal may be configured to be provided to a signal processor.

In some embodiments, the signal processor is connected with the switching element for controlling the switchable element, such as for controlling the timing of the switchable element, i.e. controlling the time between switches. The switchable element may thereby be controlled in order allow the signal processor to de-multiplex the first signal and the second signal, such as using standard time or frequency de-multiplexing schemes, such as typically used with e.g. Bluetooth communication.

In some embodiments, the switching element is synchronized with signals in either the first frequency band or the second frequency band, the switching element may be configured to be synchronized with signals in either the first frequency band or the second frequency band.

In some embodiments, the signal processor is configured to perform a first signal processing when the switching element is in a first switching position enabling the first path, and configured to perform a second signal processing when the switching element is in a second switching position enabling the second path, and comparing first signal processing results and second signal processing results, to distinguish between information carried in the first frequency band and information carried in the second frequency band.

In some embodiments, the antenna signal is a frequency division multiplexed signal. The signal processing may included de-multiplexing of the frequency division multiplexed signal.

In some embodiments, the band width of the IF filter is selected based on the band width of the first frequency band and the bandwidth of the second frequency band. Hereby, information carried in the first frequency band and the second frequency band, respectively, such as substantially all information carried in the first frequency band and the second frequency band, respectively, are provided to the signal processor.

Further disclosed is a method of dual band communication in a hearing device. It is envisaged that all elements disclosed in connection with the hearing device, applies likewise to the method of dual band communication.

The method comprises receiving an antenna signal carrying information in a first frequency band having a first centre frequency and in a second frequency band having a second centre frequency, in a wireless communication unit. The method further comprises providing a local oscillator signal in a local oscillator; receiving the local oscillator signal and the antenna signal in a mixer and mixing the antenna signal with the local oscillator signal. An output signal is provided in the mixer. The output signal is received in an IF filter: The IF filter is configured to have an IF centre frequency being the difference between the second centre frequency and the first centre frequency divided by two; wherein the local oscillator frequency is configured to be the second centre frequency subtracted the IF centre frequency.

In some embodiments, the method further comprises switching between a first path or a second path, and in the first path, filtering antenna signals in the first frequency band of the antenna signal using a first primary band pass filter, and providing a first filtered antenna signal to the wireless communication unit.

In some embodiments, the method further comprises in the second path, filtering antenna signals in the second frequency band of the antenna signal using a first secondary band pass filter, and providing a second filtered antenna signal to the wireless communication unit. Alternatively, in the second path, not filtering the antenna signal, and providing the antenna signal, such as the unfiltered antenna signal to the wireless communication unit.

It should be noted that whereas the wireless communication unit has primarily been discussed as a receiver, the same devices and methods may be used for a transmitter, mutatis mutandis.

The one or more wireless communication units may be configured for wireless communication, including wireless data communication, and is in this respect interconnected with the antenna for emission and reception of an electromagnetic field. The wireless communication unit may comprise a transmitter, a receiver, a transmitter-receiver pair, such as a transceiver, a radio, a radio circuit, etc. The wireless communication unit may be configured for communication using any protocol as known for a person skilled in the art, including Bluetooth, including Bluetooth Low Energy, Bluetooth Smart, etc., WLAN standards, manufacture specific protocols, such as tailored proximity antenna protocols, such as proprietary protocols, such as low-power wireless communication protocols, such as CSR mesh, etc.

The hearing device may furthermore comprise one or more antennas, and as an example only, the hearing device may for example have a 2.4 GHz radio antenna and/or a 1.6 GHz radio antenna, connected to the wireless communication unit for communicating with and/or for receiving information from a wireless network. The first frequency band may be a frequency band from 2.4 to 2.5 GHz, such as a Bluetooth frequency band from 2400 to 2483.5 MHz. The first center frequency may be 2450 MHz. The second frequency band may be a frequency band from 1500 MHZ to 1700 MHz, such as for example from 1656.5 to 1660 MHz. The second center frequency may be 1658 MHz.

The hearing device may comprise a microphone, a processor, a receiver or speaker, etc.

The hearing device may be a hearing aid configured for hearing loss compensating for a user wearing the hearing device.

The hearing device may be an ear protection device or a hearing protection device.

The hearing device may be a noise protection device.

The hearing device may be for audio streaming of e.g. music, phone calls, etc.

The hearing device may be configured for one or more of hearing loss compensation, noise protections, ear protection, hearing protection, audio streaming etc.

The hearing device may be an in-the-ear (ITE) hearing device, in-the-canal (ITC) hearing device, completely-in-canal (CIC) hearing device, or invisible-in-the-canal (IIC) hearing device.

The hearing device may be a receiver-in-the-ear (RITE) hearing device, receiver-in-the-ear (RIE) hearing aid, or a receiver-in-canal (RIC) hearing device. The hearing device may be a behind-the-ear (BTE) hearing device, e.g. where the receiver is arranged in a housing configured to be positioned behind the ear of a user.

BTE hearing devices may comprise a case, which hangs behind the pinna. The case may be attached to the earpiece or to a dome tip by a traditional tube, slim tube, or wire. The tube or wire may extend from the superior-ventral portion of the pinna to the concha, where the earpiece or dome tip inserts into the external auditory canal. The case may contain the electronics, controls, battery, and microphone(s). The loudspeaker, or receiver, may be housed in the case, e.g. a traditional BTE, or in the earpiece or dome tip, e.g. a receiver-in-the-canal (RIC).

The present disclosure relates to different aspects including the hearing device and method described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
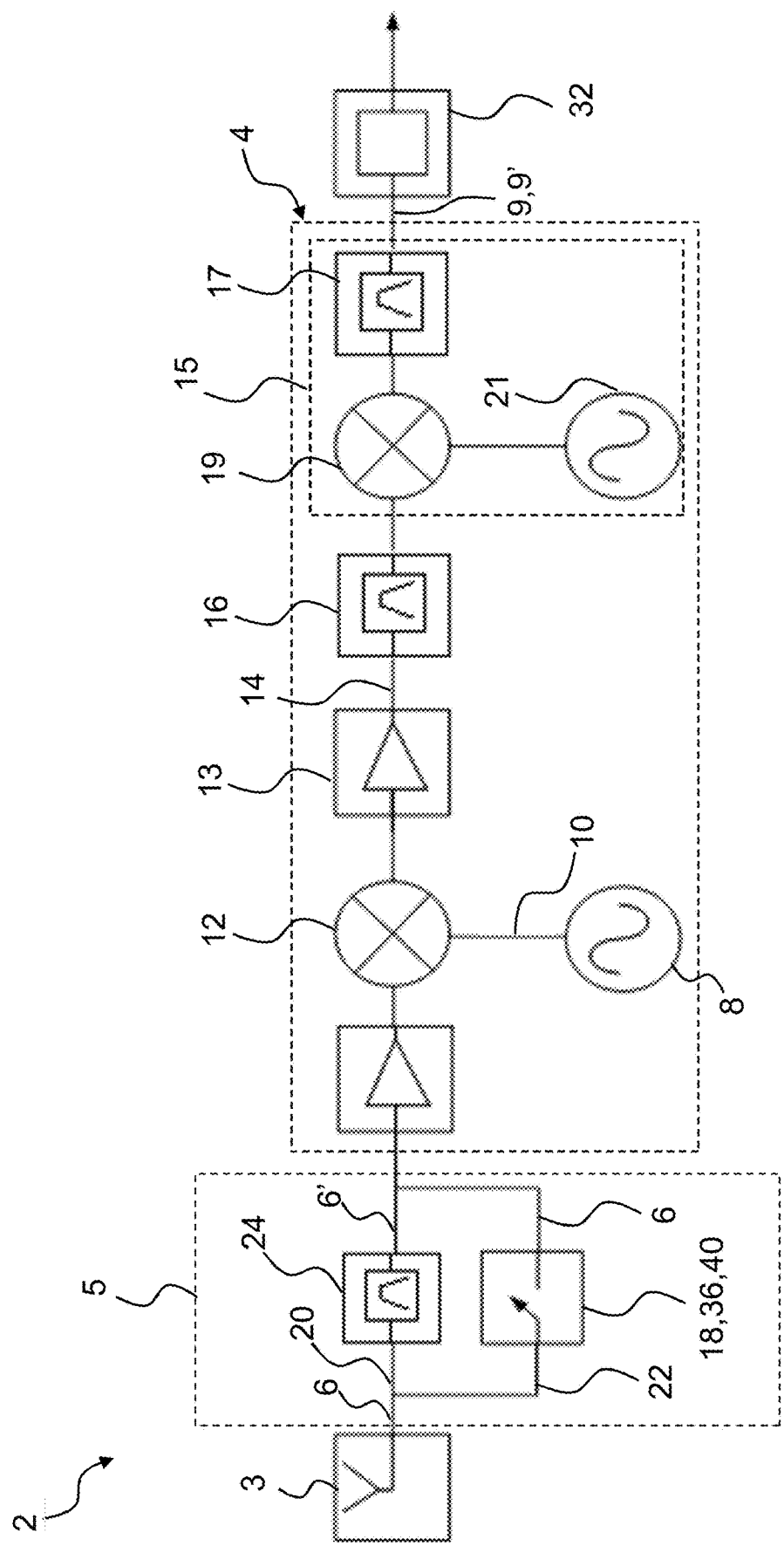
FIG. 1 schematically illustrates an example of a hearing device comprising a wireless communication unit, FIG. 2 schematically illustrates an example of a hearing device comprising a wireless communication unit, FIG. 3 schematically illustrates an example of a hearing device comprising a wireless communication unit, FIG. 4 schematically illustrates an example of a hearing device comprising a wireless communication unit.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 shows schematically a wireless communication unit 4 for a hearing device 2. An antenna signal 6 is received by antenna 3 and provided to an input stage 5 for the wireless communication unit 4. The wireless communication unit 4 is configured for receiving the antenna signal 6, the antenna signal 6 carrying information in a first frequency band having a first centre frequency and in a second frequency band having a second centre frequency. The wireless communication unit 4 is interconnected with the antenna 3; the antenna 3 being configured for transmitting and receiving electromagnetic radiation. The antenna 3 may be configured for providing the antenna signal 6.

The wireless communication unit 4 comprises a first local oscillator 8 configured for providing a first local oscillator signal 10, and a first mixer 12, the first mixer 12 being configured for receiving the first local oscillator signal 10 and the antenna signal 6, 6'. The first mixer 12 is configured for mixing the antenna signal 6, 6' with the first local oscillator signal 10. The first mixer 12 provides an output signal 14, such as a mixed output signal 14 which is amplified by first amplifier 13. The wireless communication unit 4 further comprises an intermediate frequency (IF) filter 16 configured for receiving the output signal 14.

Depending on the frequencies of the antenna signal 6, the wireless communication unit 4 may comprise a further down conversion step 15, comprising a second local oscillator 21, a second mixer and a second IF filter 17.

The output signal 9 of the wireless communication unit is provided to the signal processor 32 for further processing and de-multiplexing of the output signal 9.

The first intermediate frequency (IF) filter 16 is configured to have an intermediate frequency (IF) centre frequency being the difference between the second centre frequency and the first centre frequency divided by two (e.g., IF=(f2−f1)/2). The local oscillator frequency $f_{LO}$ may be configured to be the second centre frequency subtracted the intermediate frequency (IF) centre frequency (e.g., $f_{LO}$=f2−IF). Since $f_{LO}$=f2−IF=f2−(f2−f1)/2, that means $f_{LO}$=f2−f2/2+f1/2=(f2+f1)/2. In other words, the local oscillator frequency $f_{LO}$ may be configured to be equal to the sum of the second centre frequency and the first center frequency divided by 2, +/−5%, or +/−10% (e.g., a value anywhere between 1.8 and 2.2, such as 2).

The input stage 5 further comprises a switch 18, such as a switching element 18. The switching element 18 is configured for switching between the first path 20 and the second path 22. The first path 20 providing a first primary band pass filter 24 for the antenna signal 6 in the first frequency band of the antenna signal, such as for the first signal, wherein the first path 20 provides a first filtered antenna signal 6' to the wireless communication unit 4. Thereby, the wireless communication unit 4 receives information about the frequency distribution of the first filtered antenna signal 6', such as about the first signal 6'. The input stage may thus comprise the first primary band pass filter 24.

The switching element 18 may be configured to switch between a plurality of switching positions, including a first switching position and a second switching position; when the switch is in the first switching position the first path 20 is enabled and when the switch is in the second switching position, the second path 22 is enabled.

As is seen in FIG. 1, the second path 22 provides the antenna signal to the wireless communication unit when the switch is closed or is in the second position. The second path 22 provides the antenna signal 6 as an unfiltered antenna signal 6 to the wireless communication unit 4. When the switch is closed it shorts the filter and the antenna signal carrying information in both the first frequency band and the frequency band will be received at the wireless communication unit. When the switch is open, the first filtered antenna signal 6' is provided to the wireless communication unit.

By toggling the switching element 18, so that alternately the unfiltered antenna signal 6 and the first filtered antenna signal 6' is provided to the signal processor 32, the signal processor may de-multiplex the signals provided as output 9 of the wireless communication unit 4 as the frequency content of the first signal, i.e. of the first filtered antenna signal 6' is known. The signal processor 32 may control the switching element 18 such as the timing of the switching.

The signal processor 32 may demodulate the signals received in dependence on the modulation of the signals. The signals may be modulated using any modulation technique, such as for example frequency modulation, phase shift keying, etc. The first signal at the first frequency and the second signal at the second frequency may be modulated using a same modulation technique, or the signals may be modulated using different techniques.

Figure 2:
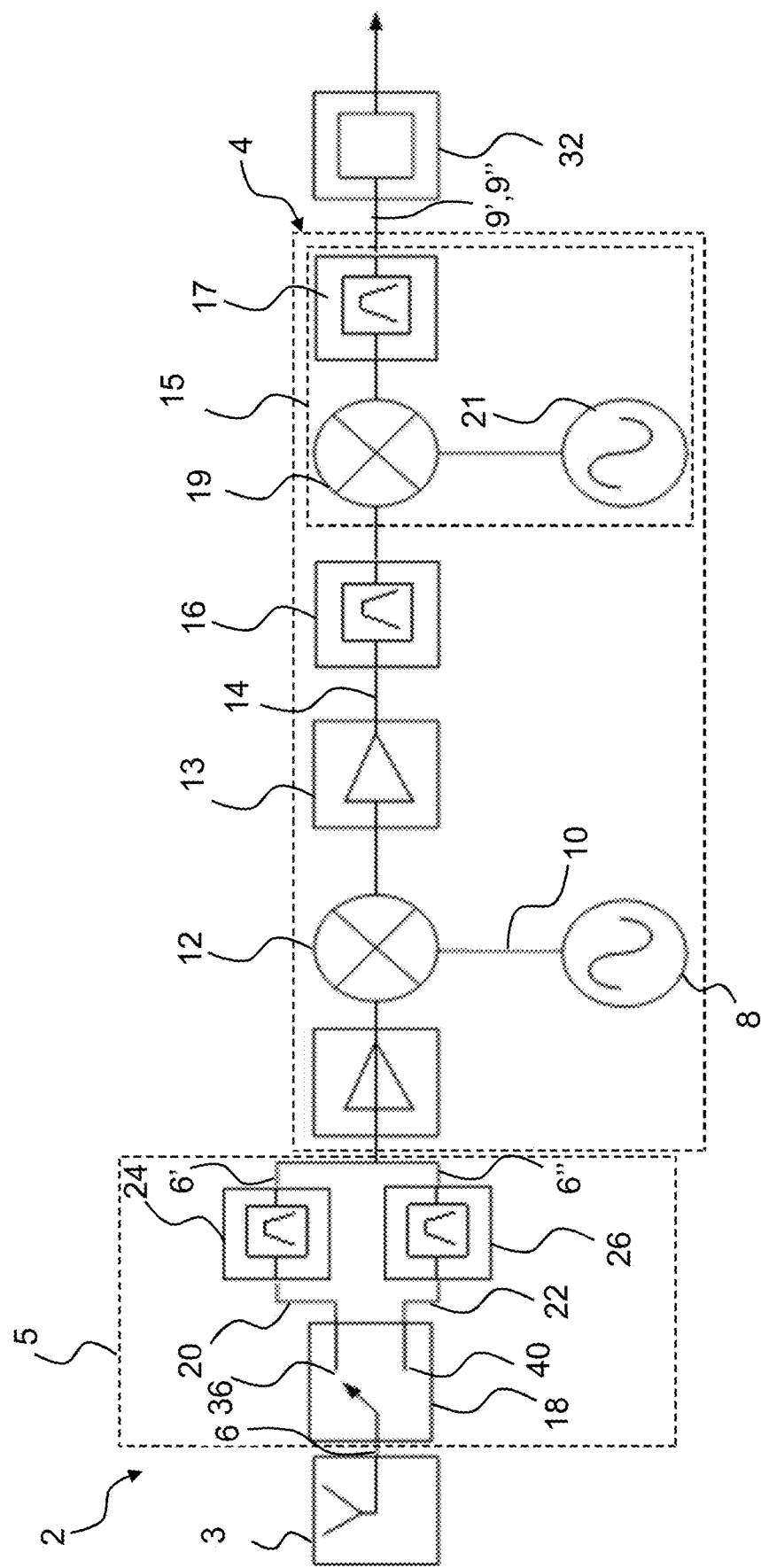

FIG. 2 shows schematically another embodiment of a wireless communication unit 4 for a hearing device 2 with input stage 5. An antenna signal 6 is received by antenna 3 and provided to an input stage 5 for the wireless communication unit 4. The wireless communication unit 4 in FIG. 2 is configured similarly to the wireless communication unit of FIG. 1. The input stage 5 of FIG. 2 is implemented differently than in FIG. 1. In FIG. 2, the input stage 5 comprises a switching element 18 configured for switching between the first path 20 and the second path 22. The first path 20 providing a first primary band pass filter 24 for the antenna signal 6 in the first frequency band of the antenna signal, such as for the first signal, wherein the first path 20 provides a first filtered antenna signal 6' to the wireless communication unit 4. Thereby, the wireless communication unit 4 receives information about the frequency distribution of the first filtered antenna signal 6', such as about the first signal 6'. The input stage may thus comprise the first primary band pass filter 24.

The switching element 18 may be configured to switch between a plurality of switching positions, including a first switching position and a second switching position; when the switch is in the first switching position the first path 20 is enabled and when the switch is in the second switching position, the second path 22 is enabled.

As is seen in FIG. 2, the second path 22 provides the antenna signal to the wireless communication unit when the switch is in the second position. The second path provides a first secondary band pass filter 26 for antenna signal 6 in the second frequency band of the antenna signal, whereby the second path 22 provides a second filtered antenna signal 6" to the wireless communication unit 4. The second filtered antenna signal 6", that is primarily the second signal, is provided to the wireless communication unit 4. Thereby, the wireless communication unit 4 receives information about the frequency distribution of the second filtered antenna signal 6", such as about the second signal. By toggling the switch 18, e.g. between the first and the second position, the wireless communication unit 4 is configured to receive a first filtered antenna signal 6' during a first time, and a second filtered antenna signal 6" during a second time. Hereby, standard processing of the first and second filtered signals may be performed in the wireless communication unit 4 and the signal processor 32. The input for the signal processor 32, which is output signal 9', 9" of the wireless communication unit 4, will alternately be the an output signal 9' and an output signal 9", in accordance with the input of the wireless communication unit 4. By toggling the switching element 18, so that alternately the second filtered antenna signal 6" and the first filtered antenna signal 6' is provided to the signal processor 32, the signal processor may de-multiplex the signals provided as output 9', 9" of the wireless communication unit 4 in a standard way as the signals are already divided.

The embodiment as suggested includes a further band pass filter, i.e. the first secondary band pass filter 26, so that the input stage 5 is more complex. However, the processing of the output signals 9', 9" may be simpler, as the frequency content of each signal is known. The embodiment as suggested in FIG. 2 may be advantageously if e.g. the signals in both frequency bands are strong signals.

Figure 3:
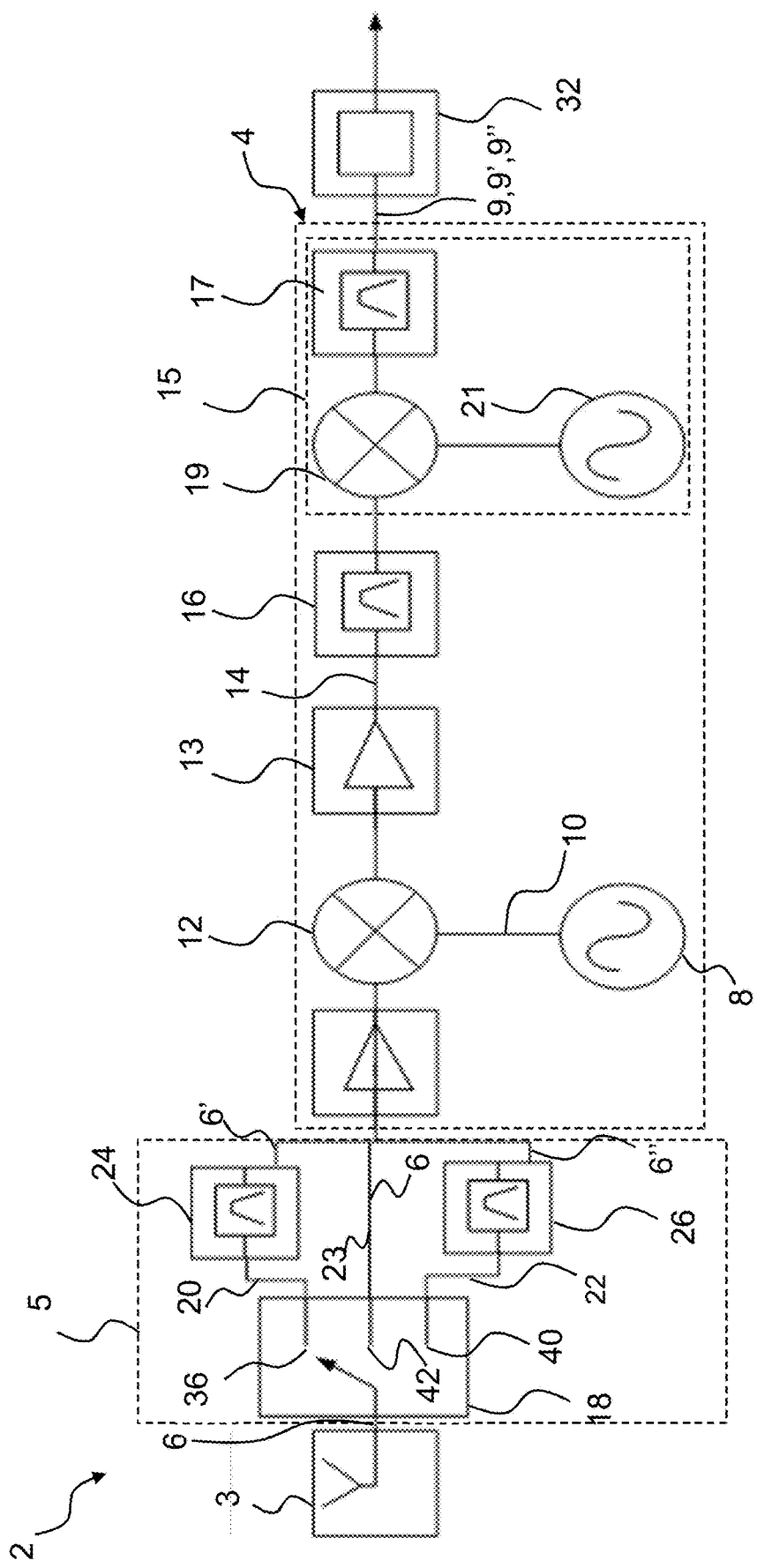

FIG. 3 shows schematically another embodiment of a wireless communication unit 4 for a hearing device 2 with input stage 5. An antenna signal 6 is received by antenna 3 and provided to an input stage 5 for the wireless communication unit 4. The wireless communication unit 4 in FIG. 3 is configured similarly to the wireless communication unit of FIG. 1 and FIG. 2. The input stage 5 of FIG. 3 is implemented differently than in FIGS. 1 and 2. In FIG. 3, the input stage 5 comprises a switching element 18 configured for three-way switching, such as for switching between the first path 20, the second path 22 and a third path 23. The first path 20 providing a first primary band pass filter 24 for the antenna signal 6 in the first frequency band of the antenna signal, such as for the first signal, wherein the first path 20 provides a first filtered antenna signal 6' to the wireless communication unit 4. Thereby, the wireless communication unit 4 receives information about the frequency distribution of the first filtered antenna signal 6', such as about the first signal 6'.

The switching element 18 is configured to switch between a three switching positions 36, 40, 42, including a first switching position 36, a second switching position 40 and a third switching position 42. When the switch 18 is in the first switching position 36, the first path 20 is enabled; when the switch 18 is in the second switching position 40, the second path 22 is enabled; and when the switch 18 is in the third switching position 42, the third path 23 is enabled.

As is seen in FIG. 3, the second path 22 provides the antenna signal to the wireless communication unit 4 when the switch 18 is in the second position 40. The second path 22 provides a first secondary band pass filter 26 for antenna signal 6 in the second frequency band of the antenna signal, whereby the second path 22 provides a second filtered antenna signal 6" to the wireless communication unit 4. The second filtered antenna signal 6", that is primarily the second signal, is provided to the wireless communication unit 4.

The third path 23 provides the antenna signal 6 to the wireless communication unit 4 when the switch 18 is in the third position 42. The third path 23 does not provide any filtering of the antenna signal, whereby the third path 23 provides an unfiltered antenna signal 6 to the wireless communication unit 4.

Thereby, the wireless communication unit 4 receives information about the frequency distribution of the first filtered antenna signal 6', the second filtered antenna signal 6" and the third unfiltered antenna signal 6. This allows for a further processing of the output signal 9, 9', 9'" in the signal processor 32.

By toggling the switch 18, e.g. between the first, second and third position, the wireless communication unit 4 is configured to receive a first filtered antenna signal 6' during a first time, and a second filtered antenna signal 6" during a second time, and the unfiltered antenna signal 6 during a third time.

The embodiment as suggested includes a further band pass filter, i.e. the first secondary band pass filter 26, as in FIG. 2, so that the input stage 5 is more complex. However, processing may be performed on both the combined, i.e. unfiltered antenna signal 6, and each of the filtered antenna signals 6', 6", possibly retaining more information after signal processing of the output signals 9, 9', 9'.

Figure 4:
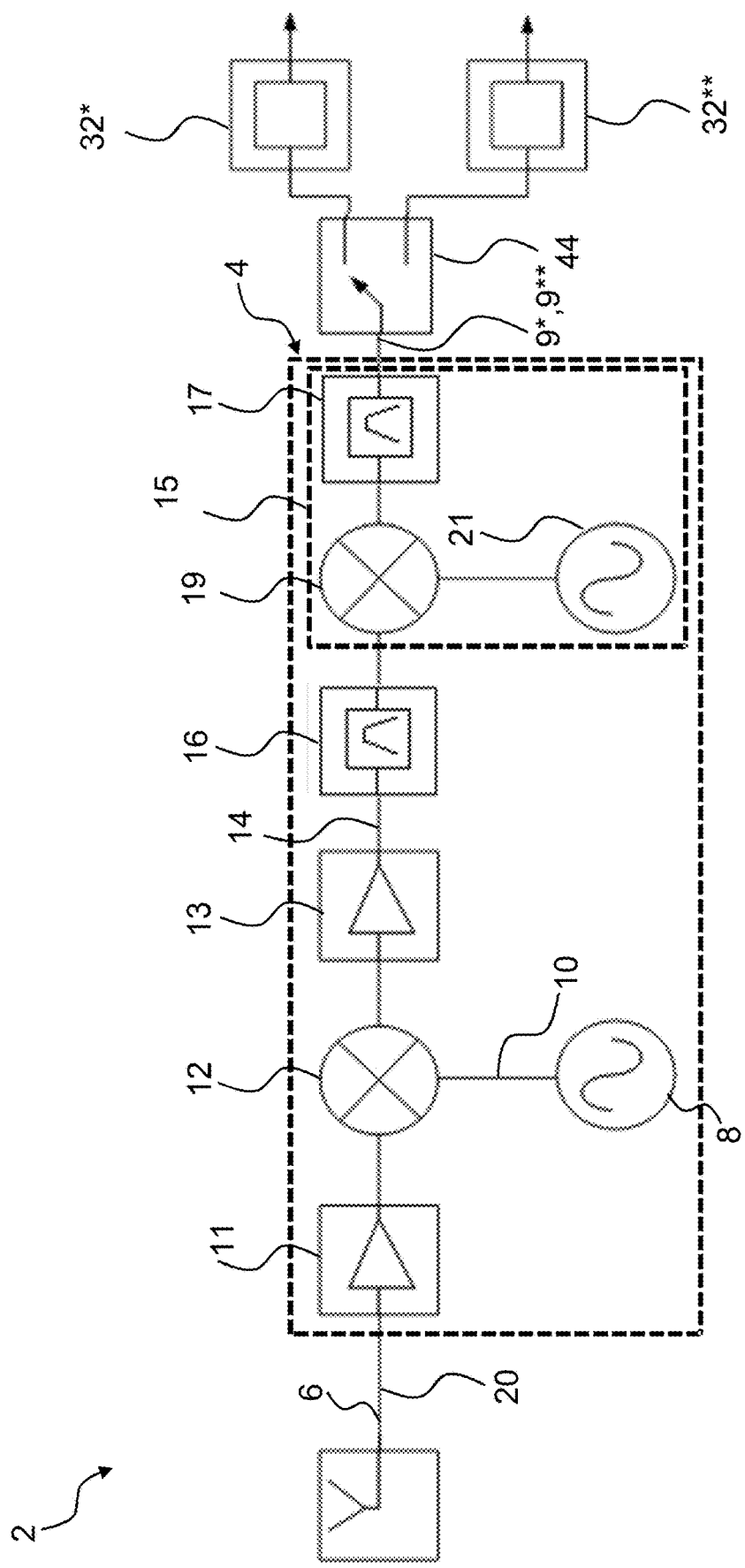

In FIG. 4, another embodiment of the hearing device is shown. FIG. 4 shows schematically another embodiment of a wireless communication unit 4 for a hearing device 2 with no input stage. The antenna signal 6 is received by antenna 3 and provided to the wireless communication unit 4. The antenna signal 6 comprises the first signal 6* being modulated using a first modulation type, and the second signal 6** being modulated using a second modulation type. The wireless communication unit 4 in FIG. 4 is configured to receive the antenna signal 6, that is the unfiltered antenna signal 6, such as the multiplexed antenna signal 6 comprising the first signal 6* and the second signal 6**. The antenna signal 6* carries information in a first frequency band having a first centre frequency and the antenna signal 6** carries information in a second frequency band having a second centre frequency. The wireless communication unit 4 comprises a first local oscillator 8, a first mixer 12. The antenna signal 6*, 6** is amplified in initial amplifier 11 and provided to the first mixer 12. The mixer receives the antenna signal 6*, 6**, such as the amplified antenna signal 6*, 6**, and the local oscillator signal 10. The first mixer 12 provides an output 14 which is amplified at first amplifier 13. The wireless communication unit 4 further comprises an intermediate frequency (IF) filter 16 configured for receiving the output signal 14.

Depending on the frequencies of the antenna signal 6*, 6**, the wireless communication unit 4 may comprise a further down conversion step 15, comprising a second local oscillator 21, a second mixer and a second IF filter 17.

The output signal 9*, 9** of the wireless communication unit 4 is provided to modulator switch 44. Modulator switch 44 switches signals having a first modulation type to the first type signal processor 32* and switches signals having a second modulation type to the second type signal processor 32**. Hereby, when the first signal 6* is modulated using a first modulation type, such as frequency modulation, and the second signal 6** is modulated using a second modulation type, such as phase-shift-keying, the modulator switch 44 will switch the first output signal 9* to the signal processor 32* for further processing and de-multiplexing of the first output signal 9* using a first de-modulation type scheme. Likewise, the modulator switch 44 will switch the second output signal 9 to the signal processor 32 for further processing and de-multiplexing of the second output signal 9** using a second de-modulation type scheme. The first type may be a frequency modulation type, and the second type may be a phase-shift-keying type, however it is envisaged that any modulation schemes as known for the skilled person may be used.

In the embodiment of FIG. 4, two demodulators, selectable with the modulator switch are shown, so that the received band can be selected by detecting the modulation type at the modulator switch. Typically, two different modulation types are used with the modulation switch. It is an advantage that the proposed band selection can be done with a modulator switch, particularly as the modulator switch may be simpler to implement than the input filters discussed above. In one example, the one signal is modulated using a 2.4 GHz band such as Bluetooth. The other signal may be a signal at 1.6 GHz using a modulation type which is different from the specified Bluetooth modulation. It is envisaged that the disclosure is not limited to the mentioned frequencies and furthermore, also other forms of band selection may be performed, e.g. using address correlator, timing, protocol etc.

Also for the embodiment in FIG. 4 is the first intermediate frequency (IF) filter 16 selected to have an intermediate frequency (IF) centre frequency being the difference between the second centre frequency (of the second signal) and the first centre frequency (of the first signal) divided by two (e.g., IF=(f2−f1)/2). The local oscillator frequency $f_{LO}$ may be configured to be the second centre frequency subtracted the intermediate frequency (IF) centre frequency (e.g., $f_{LO}$=f2−IF). Since $f_{LO}$=f2−IF=f2−(f2−f1)/2, that means $f_{LO}$=f2−f2/2+f1/2=(f2+f1)/2. In other words, the local oscillator frequency $f_{LO}$ may be configured to be equal to the sum of the second centre frequency and the first center frequency divided by 2, +/−5%, or +/−10% (e.g., a value anywhere between 1.8 and 2.2, such as 2).

Figure 5:
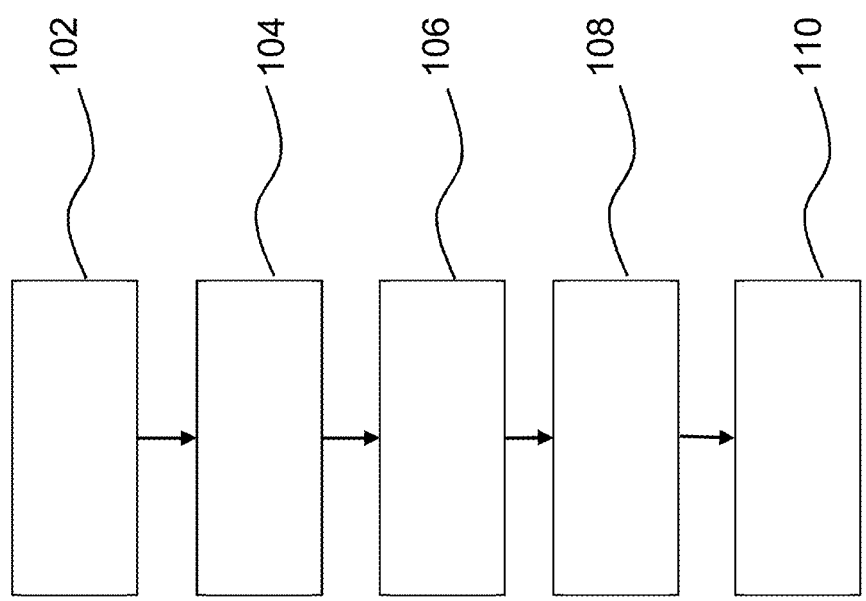
FIG. 5 is a flow diagram of a method of dual band communication in a hearing device, FIG. 6 schematically illustrate an exemplary timing for a switching element.

FIG. 5 is a flow chart of a method 100 of dual band communication in a hearing device.

The method 100 comprises in step 102 receiving an antenna signal carrying information in a first frequency band having a first centre frequency and in a second frequency band having a second centre frequency, in a wireless communication unit. The method further comprises the step 104 of providing a local oscillator signal in a local oscillator; receiving 106 the local oscillator signal and the antenna signal in a mixer and mixing the antenna signal with the local oscillator signal. In step 108, the output signal is provided in the mixer. In step 110, the output signal is received in an IF filter: The IF filter is configured to have an IF centre frequency being the difference between the second centre frequency and the first centre frequency divided by two; wherein the local oscillator frequency is configured to be the second centre frequency subtracted the IF centre frequency.

Figure 6:
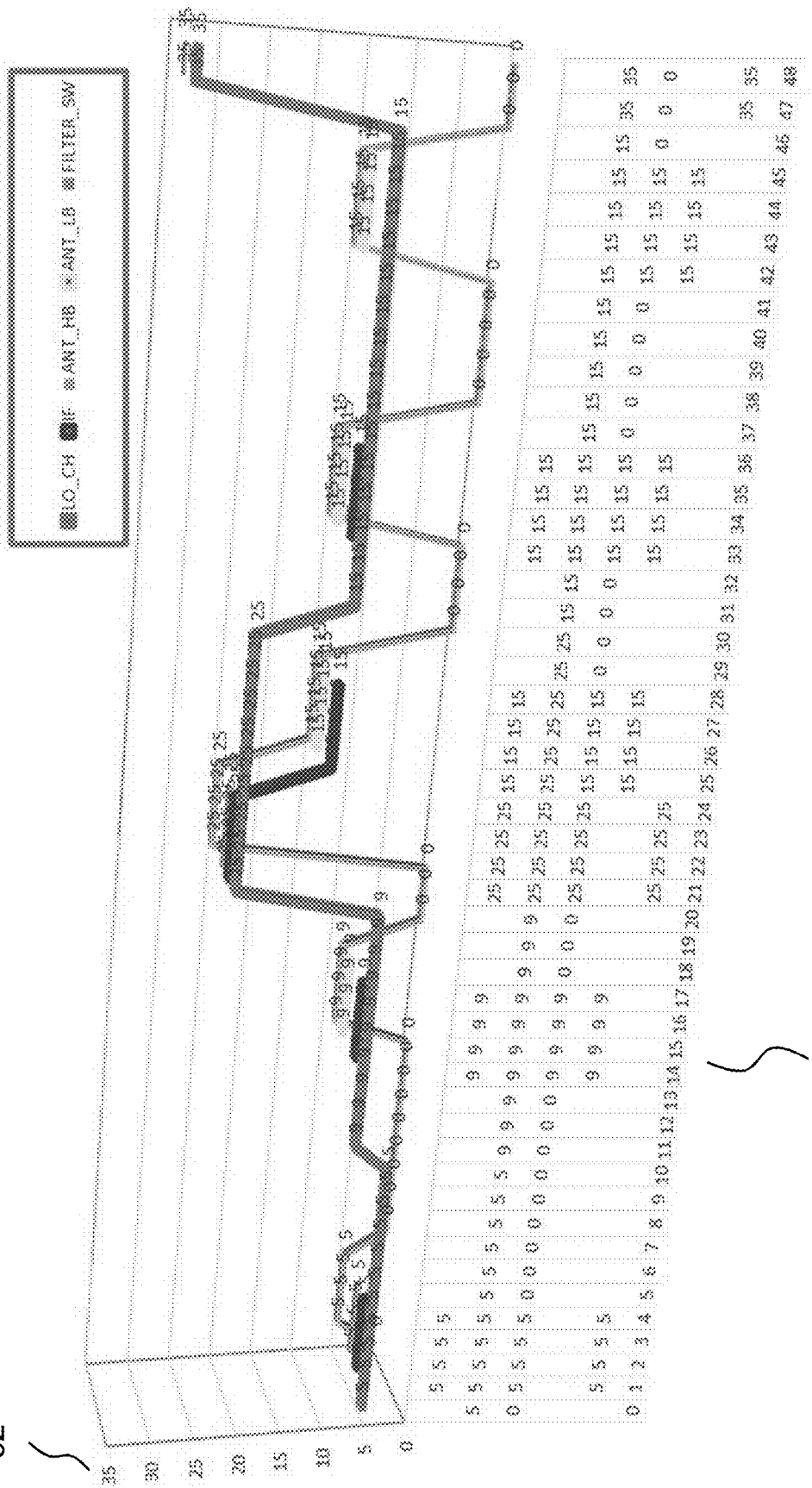

In FIG. 6 an example of a switching mechanism is provided for a system and method using time and frequency multiplexing, e.g. such as used in Bluetooth systems.

The frequency band for the local oscillator is common for both high-side and low-side.

The local oscillator is selected such as to cover 40 channels. The channels are shown along the y-axis and indicated by 62. FIG. 6 shows an example of a timing of the switching element 18 and local oscillator 8 (channel selection). Time 60 is shown on the x-axis, and time is going from 0 to 48.

From time 0->10 Channel 5 is selected and the switch 18 select the high band, that is the first path 20, e.g. in FIG. 3. From time 1 to 4, a signal burst, for example antenna signal 6", is transmitted on channel 5 in the high band, i.e. the first frequency band, and this signal burst is decoded from the IF.

From time 11->20 Channel 9 is selected and the switch 18 select the low band, such as e.g. the second path 22 in FIG. 3. From time 14 to 17, a signal burst is transmitted on channel 9 low band, thus in antenna signal 6" in the second frequency band and is decoded from the IF.

From time 21->30 Channel 25 is selected and the switch 18 selects both bands, i.e. corresponding to the third path 23 in FIG. 3, and signal 6. From time 21 to 24 a signal burst is transmitted on channel 25 low band, and is decoded from the IF. From time 25 to 28 a signal burst is transmitted on channel 15 high band, and is decoded from the IF.

From time 31->46 Channel 15 is selected and the switch select low band, i.e. the first path 20 in FIG. 3. From time 33 to 36 a signal burst is transmitted on channel 15 low band, and is decoded from the IF. From time 42 to 45 a signal burst is transmitted on channel 15 low band, and is decoded from the IF.

From time 47->48 Channel 35 is selected and the switch 18 selects the low band, i.e. the first path 20 in FIG. 3. From time 47 to 48 a signal burst is transmitted on channel 35 high band, and is NOT decoded from the IF.

Figure 7:
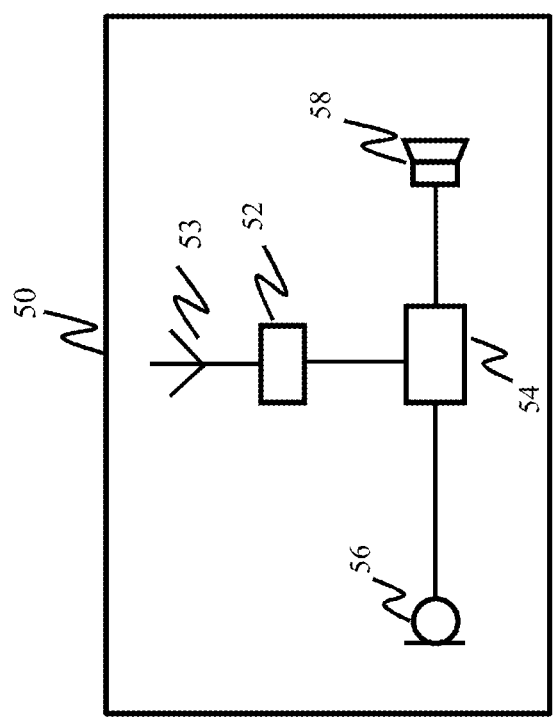
FIG. 7 shows an exemplary hearing device.

FIG. 7 schematically illustrates an exemplary hearing device. The hearing device 50 comprises a hearing device processing unit 54 configured to provide a processed output signal for compensating a hearing loss of a user. The hearing device 50 comprises a microphone 56 connected to the processing unit 54 for converting an audio input signal into a microphone output signal to form an input signal to the processing unit 54. The hearing device 50 comprises a receiver 58 connected to the processing unit 54 for converting the processed output signal into an audio output signal. The hearing device 50 comprises one or more wireless communication units 4 connected to the processing unit 54 for receiving information from a wireless network. The hearing device 50 further comprises one or more antennas 53, such as a 2.4 GHz radio antenna and/or a 1.6 GHz radio antenna, connected to the wireless communication unit 52 for communicating with and/or for receiving information from the wireless network.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 hearing device
3 antenna
4 wireless communication unit 5 input stage
6 antenna signal
6', 6" first, second filtered antenna signal
6* first modulated signal
6** second modulated signal
8 first local oscillator
9, 9', 9" WCU output
9*, 9** WCU output
10 local oscillator signal
12 first mixer
13 first amplifier
14 first output signal
15 down conversion step
16 first IF filter
17 second IF filter
18 switching element
19 second mixer
20 first path
21 second local oscillator
22 second path
23 third path
24 first primary band pass filter
26 first secondary band pass filter
32, 32*, 32** signal processor
36 first switching position
40 second switching position
42 third switching position
44 modulator switch
50 hearing device
54 hearing device processing unit
56 microphone
58 receiver

The invention claimed is:

1. A hearing device comprising:
a wireless communication unit configured for receiving an antenna signal carrying information in a first frequency band having a first centre frequency, and information in a second frequency band having a second centre frequency;
wherein the wireless communication unit comprises:
a local oscillator configured to provide a local oscillator signal;
a mixer configured to receive the local oscillator signal and mixing the antenna signal with the local oscillator signal, the mixer providing an output signal; and
a filter configured to receive the output signal;
wherein a centre frequency associated with the filter is equal to a fraction of a difference between the second centre frequency and the first centre frequency; and
wherein a local oscillator frequency associated with the local oscillator is equal to a difference between the second centre frequency and the centre frequency associated with the filter.

2. The hearing device according to claim 1, wherein the centre frequency is equal to the difference between the second centre frequency and the first centre frequency, divided by 2.

3. The hearing device according to claim 1, further comprising a switching element configured to switch between a first path or a second path, the first path comprising a first primary band pass filter for filtering signals in the first frequency band, wherein the first path is configured to provide a first filtered antenna signal to the wireless communication unit.

4. The hearing device according to claim 3, wherein the second path comprises a first secondary band pass filter for filtering signals in the second frequency band, wherein the second path is configured to provide a second filtered antenna signal to the wireless communication unit.

5. The hearing device according to claim 3, wherein the second path is configured to provide the antenna signal to the wireless communication unit without any signal filtering.

6. The hearing device according to claim 3, wherein the second path is configured to provide a second primary band pass filter for filtering signals in the first frequency band, and to provide a second secondary band pass filter for filtering signals in the second frequency band.

7. The hearing device according to claim 3, wherein the switching element is configured to switch between the first path and the second path at predetermined time intervals.

8. The hearing device according to claim 3, further comprising a signal processor connected with the switching element for controlling the switching element.

9. The hearing device according to claim 3, wherein the switching element is synchronized with signals in either the first frequency band or the second frequency band.

10. The hearing device according to claim 3, further comprising a signal processor configured to perform a first signal processing when the switching element is in a first switching position associated with the first path, and configured to perform a second signal processing when the switching element is in a second switching position associated with the second path.

11. The hearing device according to claim 1, further comprising a signal processor configured to compare first signal processing results and second signal processing results, to distinguish between the information carried in the first frequency band and the information carried in the second frequency band.

12. The hearing device according to claim 1, further comprising a signal processor configured to receive the output signal.

13. The hearing device according to claim 12, wherein the antenna signal is a frequency division multiplexed signal, and wherein the signal processor is configured to perform de-multiplexing.

14. The hearing device according to claim 1, wherein a band width of the filter is selected based on the band width of the first frequency band and the second frequency band.

15. A hearing device comprising:
a wireless communication unit configured for receiving an antenna signal carrying information in a first frequency band having a first centre frequency, and information in a second frequency band having a second centre frequency;
wherein the wireless communication unit comprises:
a local oscillator configured to provide a local oscillator signal;
a mixer configured to receive the local oscillator signal and mixing the antenna signal with the local oscillator signal, the mixer providing an output signal; and
a filter configured to receive the output signal;
wherein a centre frequency associated with the filter is equal to a fraction of a difference between the second centre frequency and the first centre frequency; and
wherein a local oscillator frequency associated with the local oscillator is equal to a sum of the first centre frequency and the second centre frequency divided by a value that is anywhere from 1.8 to 2.2.

16. The hearing device according to claim 15, wherein the centre frequency is equal to 0.5 times a difference between the second centre frequency and the first centre frequency.

17. The hearing device according to claim 15, wherein the hearing device is configured to set the local oscillator frequency for the local oscillator by adding the centre frequency to the first centre frequency, or by subtracting the centre frequency from the second centre frequency.

18. The hearing device according to claim 15, wherein the centre frequency is equal to the difference between the second centre frequency and the first centre frequency, divided by 2.

19. The hearing device according to claim 15, further comprising a switching element configured to switch between a first path or a second path, the first path comprising a first primary band pass filter for filtering signals in the first frequency band, wherein the first path is configured to provide a first filtered antenna signal to the wireless communication unit.

20. The hearing device according to claim 19, wherein the second path comprises a first secondary band pass filter for filtering signals in the second frequency band, wherein the second path is configured to provide a second filtered antenna signal to the wireless communication unit.

21. The hearing device according to claim 19, wherein the second path is configured to provide the antenna signal to the wireless communication unit without any signal filtering.

22. The hearing device according to claim 19, wherein the second path is configured to provide a second primary band pass filter for filtering signals in the first frequency band, and to provide a second secondary band pass filter for filtering signals in the second frequency band.

23. The hearing device according to claim 19, wherein the switching element is configured to switch between the first path and the second path at predetermined time intervals.

24. The hearing device according to claim 19, further comprising a signal processor connected with the switching element for controlling the switching element.

25. The hearing device according to claim 19, wherein the switching element is synchronized with signals in either the first frequency band or the second frequency band.

26. The hearing device according to claim 19, further comprising a signal processor configured to perform a first signal processing when the switching element is in a first switching position associated with the first path, and configured to perform a second signal processing when the switching element is in a second switching position associated with the second path.

27. The hearing device according to claim 15, further comprising a signal processor configured to compare first signal processing results and second signal processing results, to distinguish between the information carried in the first frequency band and the information carried in the second frequency band.

28. The hearing device according to claim 15, further comprising a signal processor configured to receive the output signal.

29. The hearing device according to claim 28, wherein the antenna signal is a frequency division multiplexed signal, and wherein the signal processor is configured to perform de-multiplexing.

30. The hearing device according to claim 15, wherein a band width of the filter is selected based on the band width of the first frequency band and the second frequency band.

31. A method of dual band communication performed by a hearing device, comprising:
receiving an antenna signal carrying information in a first frequency band having a first centre frequency and in a second frequency band having a second centre frequency, by a wireless communication unit;
providing a local oscillator signal by a local oscillator;
mixing the antenna signal with the local oscillator signal by a mixer;
providing an output signal by the mixer;
receiving the output signal by a filter:
wherein a centre frequency associated with the filter is equal to a fraction of a difference between the second centre frequency and the first centre frequency;
wherein a local oscillator frequency of the local oscillator is equal to the second centre frequency subtracted the centre frequency associated with the filter.

32. The method according to claim 31, further comprising switching between a first path or a second path;
wherein in the first path, signals in the first frequency band are filtered using a first primary band pass filter, and
wherein the method further comprises providing a first filtered antenna signal to the wireless communication unit.

33. The method according to claim 32, wherein in the second path, signals in the second frequency band are filtered using a first secondary band pass filter; and
wherein the method further comprises providing a second filtered antenna signal to the wireless communication unit.

34. The method according to claim 32, wherein in the second path, the antenna signal is not filtered, and is provided to the wireless communication unit via the second path.

35. A method of dual band communication performed by a hearing device, comprising:
receiving an antenna signal carrying information in a first frequency band having a first centre frequency and in a second frequency band having a second centre frequency, by a wireless communication unit;
providing a local oscillator signal by a local oscillator;
mixing the antenna signal with the local oscillator signal by a mixer;
providing an output signal by the mixer;
receiving the output signal by a filter:
wherein a centre frequency associated with the filter is equal to a fraction of a difference between the second centre frequency and the first centre frequency;
wherein a local oscillator frequency associated with the local oscillator is equal to a sum of the first centre frequency and the second centre frequency divided by a value that is anywhere from 1.8 to 2.2.

36. The method according to claim 35, further comprising switching between a first path or a second path;
wherein in the first path, signals in the first frequency band are filtered using a first primary band pass filter, and
wherein the method further comprises providing a first filtered antenna signal to the wireless communication unit.

37. The method according to claim 36, wherein in the second path, signals in the second frequency band are filtered using a first secondary band pass filter; and
wherein the method further comprises providing a second filtered antenna signal to the wireless communication unit.

38. The method according to claim 36, wherein in the second path, the antenna signal is not filtered, and is provided to the wireless communication unit via the second path.

* * * * *